United States Patent
Kakarala et al.

(10) Patent No.: US 10,165,424 B2
(45) Date of Patent: Dec. 25, 2018

(54) NEAR FIELD COMMUNICATION (NFC) VEHICLE IDENTIFICATION SYSTEM AND PROCESS

(71) Applicant: NextGen Pro, LLC, Charlotte, NC (US)

(72) Inventors: Srinivas Kakarala, Ellicott City, MD (US); Kartikeya Kakarala, Irving, TX (US)

(73) Assignee: NextGen Pro, LLC, Charlotte, NC (US)

( * ) Notice: Subject to any disclaimer, the term of this patent is extended or adjusted under 35 U.S.C. 154(b) by 357 days.

(21) Appl. No.: 14/614,160

(22) Filed: Feb. 4, 2015

(65) Prior Publication Data

US 2015/0223012 A1    Aug. 6, 2015

Related U.S. Application Data

(60) Provisional application No. 61/935,700, filed on Feb. 4, 2014.

(51) Int. Cl.
| | |
|---|---|
| *H04B 5/00* | (2006.01) |
| *H04W 4/80* | (2018.01) |
| *G06Q 20/32* | (2012.01) |
| *G06Q 30/06* | (2012.01) |
| *H04W 4/04* | (2009.01) |

(52) U.S. Cl.
CPC ............ *H04W 4/80* (2018.02); *G06Q 20/322* (2013.01); *G06Q 30/0633* (2013.01); *H04B 5/0031* (2013.01); *H04B 5/0056* (2013.01); *H04W 4/046* (2013.01)

(58) Field of Classification Search
None
See application file for complete search history.

(56) References Cited

U.S. PATENT DOCUMENTS

| | | | | |
|---|---|---|---|---|
| 2008/0046383 | A1* | 2/2008 | Hirtenstein | ........ G06Q 30/0278 705/400 |
| 2013/0317693 | A1* | 11/2013 | Jefferies | ................. G07B 15/00 701/31.5 |

(Continued)

OTHER PUBLICATIONS

Evizal1 e, Rahman T, Rahim S, Rosa S. Development of RFID EPC Gen2 Tag for Multi Access Control System. International Journal of Electrical & Computer Engineering (2088-8708) [serial online]. Dec. 2013;3(6):724-731. Available from: Applied Science & Technology Source, Ipswich, MA. (Year: 2013).*

*Primary Examiner* — Resha Desai
*Assistant Examiner* — Lance Y Cai
(74) *Attorney, Agent, or Firm* — Akerman LLP; Peter A. Chiabotti; Mammen (Roy) P. Zachariah, Jr.

(57) ABSTRACT

An automotive near field communication (NFC) application that includes a process which is implemented as a mobile software application and uses near field communication tags to store and retrieve automotive vehicle information is disclosed. The process does not need a user to access the VIN and then manually enter or scan the VIN. In this process the VIN is written to an NFC tag using an NFC enabled mobile device and placed on the vehicle. A user can bump, touch, or place the NFC enabled mobile device on the NFC tag to retrieve the VIN. The application is configured to generate a vehicle value or vehicle report based, in part, on vehicle information received from the NFC tag.

11 Claims, 11 Drawing Sheets

(56) References Cited

U.S. PATENT DOCUMENTS

| | | | |
|---|---|---|---|
| 2014/0156319 A1* | 6/2014 | Deeb | G06Q 30/06 705/5 |
| 2015/0029016 A1* | 1/2015 | Lesesky | B60C 23/045 340/442 |
| 2015/0100448 A1* | 4/2015 | Binion | G06Q 30/08 705/26.3 |

* cited by examiner

NEAR FIELD COMMUNICATION (NFC) VEHICLE IDENTIFICATION SYSTEM AND PROCESS

CROSS REFERENCE TO RELATED APPLICATIONS

This application claims the benefit of U.S. Provisional Patent Appl. No. 61/935,700 filed on Feb. 4, 2014, the contents of which are hereby incorporated by reference in their entirety.

FIELD OF INVENTION

The present invention, and various embodiments thereof, relates to identification systems and processes, and more particularly, to wireless identification systems and processes.

BACKGROUND

Many objects and items that people buy, sell, operate, or otherwise use include codes that allow them or others to identify the objects or items. For instance, bar codes allow store clerks and cashiers to quickly identify consumer sale items and their associated sale prices, among other information. Some items include codes that identify individual objects among several objects of the same build, model, make, design, etc. For example, automobiles includes a Vehicle Identification Number (VIN) which uniquely identifies each individual automobile (even distinguishing the automobiles across a make and model). Such identifying codes are currently only accessible to a user who is required to manually input (e.g., type in) the VIN of a vehicle or scan the VIN barcode using a mobile device's camera to retrieve the VIN of a vehicle. The current process is very cumbersome, can result in user input errors, and has a problematic issue with low light conditions or glare conditions in which the user cannot accurately scan a VIN using the mobile device camera (e.g., the camera is not able to capture an image that clearly includes the numbers/letters of the VIN).

The current problem with scanning or manually entering a Vehicle Identification Number (VIN) is accessibility of the VIN on the Vehicle. The VIN is a barcode printed on a metal strip which is on the vehicle in different locations of the vehicle and is often pretty cumbersome to access it with a mobile device camera. Therefore, there is a need for a process which does not need a user to access the VIN for manual entry or scanning of the VIN.

SUMMARY

The present invention solves the problems associated with scanning or manually entering a VIN number by providing a system and method for the VIN to be written to an NFC tag using an NFC Enabled Mobile Device and thereafter placed on the vehicle, such that a user can bump, touch, or place the NFC enabled mobile device on the NFC Tag (on the vehicle) to retrieve the VIN.

One embodiment of the invention includes a system and process for retrieving a vehicle identification number (VIN) from a near field communication (NFC) tag placed on a vehicle associated with the VIN at a position that is accessible to a mobile device in order to use the VIN in a software application that implements the process on the mobile device.

In one embodiment, the invention includes a vehicle identification system that retrieves vehicle information by way of a vehicle identification number (VIN) stored on a near field communication (NFC) tag, the system comprising: an NFC tag comprising an internally-stored VIN, the NFC tag placed at a position on the vehicle accessible by an NFC-enabled mobile computing device, wherein the mobile computing device comprises a storage device, a processor, and an NFC receiver/transmitter that can read from and write to the NFC tag; and a mobile software application that is installed on the storage device of the mobile computing device and when executed on the processor of the mobile computing device, performs a set of instructions to (i) write the VIN to the NFC tag; (ii) retrieve the VIN from the NFC tag when the NFC enabled mobile computing device makes contact with the NFC tag; (iii) transfer the VIN and associated VIN-information to a database for storage and later retrieval; (iv) collect vehicle data from third party sources; (v) analyze vehicle data associated with the VIN and vehicle data collected from third party sources; and (vi) calculate one of a vehicle value or vehicle report.

In one embodiment, the invention includes a method of generating a vehicle value, wherein the value corresponds to the value of the vehicle associated with a vehicle identification number (VIN) stored on a near-field communication tag and retrieved from the NFC tag by an NFC enabled device, wherein the NFC tag and NFC enabled device are part of a vehicle identification system, the method comprising: retrieving a VIN and VIN-associated data from a vehicle equipped with an NFC tag whereon VIN and VIN-associated data is written by an NFC-enabled portable device configured to read the NFC tag; transferring the VIN and VIN-associated data via a wireless communications network from the NFC-enabled device to a database, wherein a collection of third-party vehicle information is stored; comparing the VIN retrieved from the vehicle equipped with the NFC tag to the collection of third-party vehicle information, by way of an analytics engine, in order to calculate a value for the vehicle associated with the VIN; and transmitting the value for display on the NFC-enabled portable device. And wherein the value is one or more of an appraisal value, a trade-in value, or an auction value of a vehicle. Optionally, a request is sent from the application running on the NFC enabled device to one or more third party databases containing vehicle data in order to retrieve specific vehicle-related data, for further analysis by the analytics engine. For example, a third party database may be queried for data related to a specific make and model of vehicle, dealership inventory of a specific vehicle or type of vehicle, history of a specific vehicle, repair record or a vehicle or type of vehicle, photos of vehicles, and/or financing details related to the vehicle.

In one embodiment, the invention includes a method of generating an electronic purchase order form for a vehicle associated with a vehicle identification number (VIN) stored on a near field communication tag, the NFC tag being part of a vehicle identification system, the method comprising: retrieving a VIN and VIN-associated data from a vehicle equipped with an NFC tag whereon VIN and VIN-associated data is written by an NFC-enabled portable device configured to read the NFC tag; entering a driver's license number or other driver identification information via an input on the NFC-enabled portable device; transferring one or both of the driver's license number or other driver identification information and the VIN and VIN-associated data via a wireless communications network from the NFC-enabled device to a database; combining the one or both of the driver's license number or other driver identification information and the VIN and VIN-associated data to generate a purchase order record for the vehicle associated with the VIN; storing the purchase order record containing the driver identification information and vehicle information in the database for later retrieval; inputting the information associated with the purchase order record into one or more fields of a purchase order form stored in the database, thereby populating the order form; and storing the populated purchase order form in the database for electronic delivery to a buyer or seller, thereby creating an electronic purchase order form for a particular vehicle of interest to the buyer or seller. The electronic purchase order form may be viewed on the NFC enabled portable device, or stored in a database for retrieval by a user. In one embodiment, retrieval may be by way of a web portal, URL or other web-based link to the database wherein the report resides. In another embodiment, the system is configured for remote access of vehicle reports, including the purchase order form, through a user interface wherein credentials are established and authenticated for remote access by authorized users to log-in and retrieve user-specific reports.

In one embodiment, the invention includes a portable device comprising: a display; a communication unit that communicates with an NFC tag comprising an internally stored VIN and VIN-associated data and transmits VIN and VIN-associated data by a NFC receiver/transmitter configured to read from and write to the NFC tag; and controls the communication unit to transmit the VIN and VIN-associated info to a database for storage and later retrieval by the portable device.

In one embodiment, the invention includes a non-transitory computer readable medium having recorded thereon a program that causes a portable device to execute a method for generating a value for a vehicle associated with a vehicle identification number stored on a near field communication tag, wherein the NFC tag is part of a vehicle identification system, the method comprising: retrieving a VIN and VIN-associated data from a vehicle equipped with an NFC tag whereon VIN and VIN-associated data is written by an NFC-enabled portable device configured to read the NFC tag; transferring the VIN and VIN-associated data via a wireless communications network from the NFC-enabled device to a database, wherein a collection of third-party vehicle information is stored; comparing the VIN retrieved from the vehicle equipped with the NFC tag to the collection of third-party vehicle information in order to calculate, by way of an analytics engine, a value for the vehicle associated with the VIN; and transmitting and/or storing the value for display and/or later retrieval on the NFC-enabled portable device.

In one embodiment, the invention includes a non-transitory computer readable medium having recorded thereon a program that causes a portable device to execute a method for generating and populating an electronic purchase order form for a vehicle associated with a vehicle identification number (VIN) stored on a near field communication tag, wherein the NFC tag is part of a vehicle identification system, the method comprising: retrieving a VIN and VIN-associated data from a vehicle equipped with an NFC tag whereon VIN and VIN-associated data is written by an NFC-enabled portable device configured to read the NFC tag; entering a driver's license number or other driver identification information via an input on the NFC-enabled portable device; transferring one or both of the driver's license number or other driver identification information and the VIN and VIN-associated data via a wireless communications network from the NFC-enabled device to a database; combining the one or both of the driver's license number or other driver identification information and the VIN and VIN-associated data and forming a purchase order record for the vehicle associated with the VIN; storing the purchase order record containing the driver identification information and vehicle information in the database for later retrieval; inputting the information associated with the purchase order record into one or more fields of a purchase order form stored in the database; and storing the populated purchase order form in the database for electronic delivery to a buyer or seller, thereby creating an electronic purchase order form for a particular vehicle of interest to the buyer or seller.

In another embodiment, a near-field communication (NFC) system is disclosed which may include an NFC tag comprising a memory configured to store vehicle identification data corresponding to a vehicle identification number, and a first NFC sensor coupled to the memory and configured to initiate a transaction based upon NFC communications. The NFC system may further include a mobile wireless communications device comprising a second NFC sensor and a controller coupled thereto. The controller may be configured to establish NFC communications with the first NFC sensor when in proximity thereto and retrieve the vehicle data therefrom, authenticate a vehicle based upon the retrieved data, and perform analytic analysis of the vehicle data, and calculate a value for the identified vehicle A mobile application for carrying out a method of calculating a vehicle value based on vehicle data retrieved from an NFC tag, the method may include establishing NFC communications between a first NFC sensor of an NFC tag and a second NFC sensor of a mobile wireless communications device when in proximity with one another to retrieve vehicle data from a memory of the NFC tag to the mobile wireless communications device.

BRIEF DESCRIPTION OF THE DRAWINGS

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete.

DETAILED DESCRIPTION OF THE INVENTION

Figure 1:
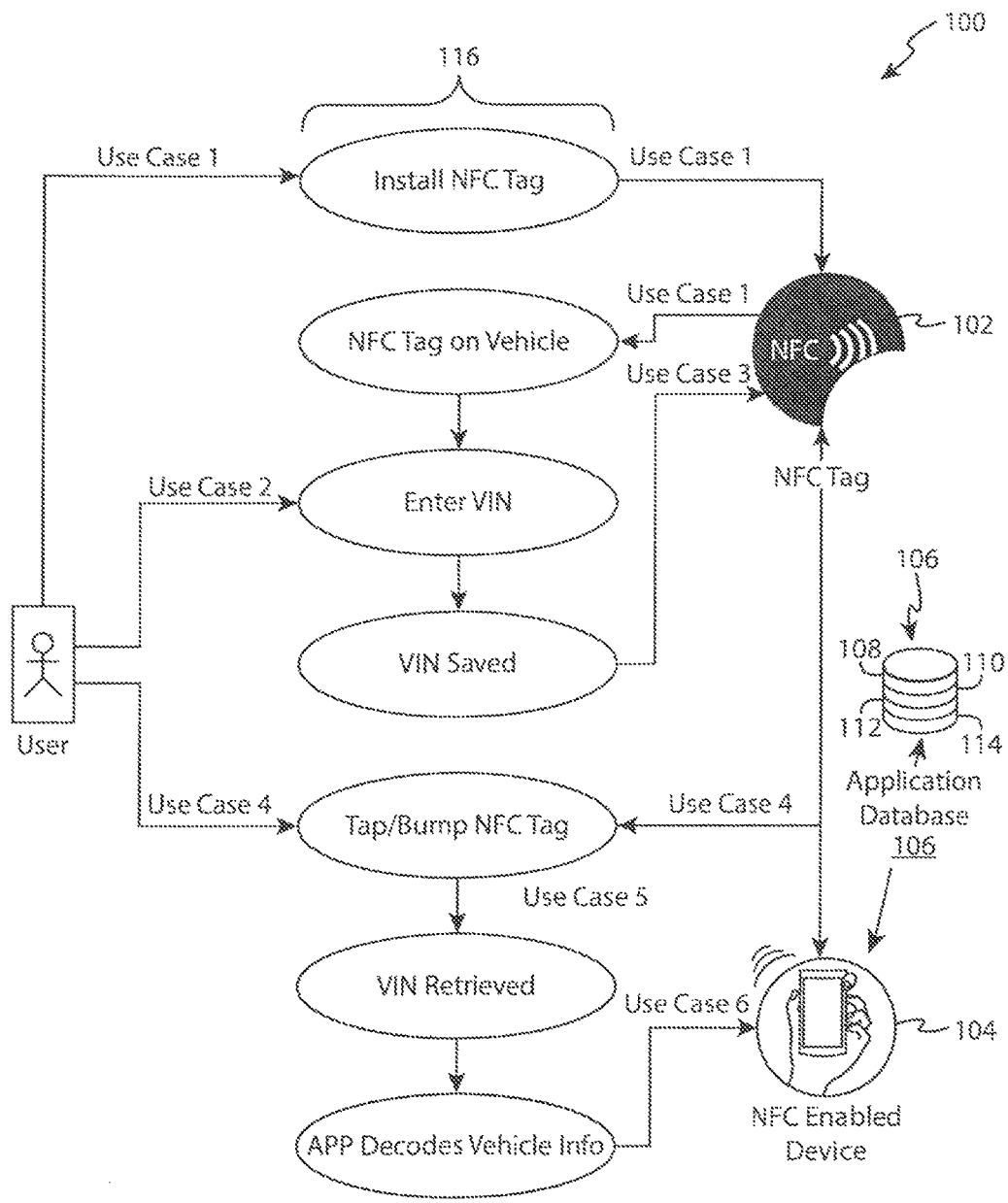
FIG. 1 shows an exemplary vehicle identification system according to one embodiment of the invention, comprised of an NFC tag, an NFC enabled device, and an application database.

In the following detailed description of the invention, numerous details, examples, and embodiments of the invention are described. However, it will be clear and apparent to one skilled in the art that the invention is not limited to the embodiments set forth and that the invention can be adapted for any of several applications. For example, vehicle data refers to data associated with the manufacture, sale and financing of a vehicle—such as make, model, trim, mileage, body style, year, vehicle identification number, vehicle repair history, MSRP, trade-in value—and can be customized based on the end user, whether a consumer, dealer, manufacturer, or insurer.

Some embodiments of the invention include a novel vehicle identification system and process for retrieving a vehicle identification number (VIN) from a near field communication (NFC) tag placed on a vehicle associated with the VIN at a position that is accessible to a mobile device in order to use the VIN in a software application that implements the process on the mobile device. In some embodiments, the process includes storing the VIN to the NFC tag and retrieving the VIN from the NFC tag using an NFC-enabled mobile computing device. Additional embodiments include software modules that cause the application to perform one or more of steps such as write data to an NFC tag; read data from an NFC tag; retrieve vehicle data from one or more third party databases; and perform analytic analysis of vehicle data in order to generate one or more of a vehicle value or vehicle report.

As stated above, a user currently has to manually input a VIN associated with a vehicle or scan a VIN in some way (e.g., by scanning a bar code of the VIN) using a mobile device's camera, thereby allowing the vehicle's VIN to be retrieved. The current process is very cumbersome and has an issue with low light conditions or glare conditions where the user cannot accurately scan a VIN using the mobile device camera. Embodiments of the invention described in this specification solve such problems by using an NFC-related process in which a user can store and retrieve a VIN via an NFC tag using an NFC-enabled device. Using this process the user is not dependent on the camera of a mobile device and is not dependent on direct or ambient light conditions.

The embodiments described in this specification differ from and improve upon currently existing options. In particular, some embodiments differ because, to date, there is no current process in the automotive industry where the VIN is written to an NFC tag and retrieved from the NFC tag using an NFC-enabled mobile device. This is the first in the industry to write and retrieve a VIN from an NFC tag. In addition, these embodiments improve upon the currently existing options by the ability to place an NFC tag at convenient locations on a vehicle which allow any NFC-enabled mobile computing device to easily retrieve VIN information related to the vehicle.

In one embodiment of the present invention, a VIN is written to an NFC tag using an NFC-enabled mobile device and placed on the vehicle to which the VIN corresponds. A user of an NFC-enabled mobile device can then bump, touch, or place the NFC-enabled mobile device on the NFC Tag to retrieve the VIN. In one embodiment, the process and method are implemented via software which includes a mobile software application (i.e., a mobile app). The mobile app directs one or more NFC embedded modules of the mobile device to capture the information of the NFC tag upon a touch, bump, or placement. The mobile app then retrieves the VIN from the NFC tag which passes the VIN as a parameter to the mobile app on the mobile device.

In some embodiments, the system can be adapted to produce Identification Number Retrieval Products using NFC tags in different motor vehicles like VIN retrieval product for motorcycles, chassis number retrieval product, HIN (Hull Identification Number) retrieval product for boats, and ID Numbers retrieval product for personal watercraft. The retrieval products are essentially short-hand for various vehicle identification data, such as make/model for a particular VIN. For example: the system can be configured to recognize/translate variables, such as "F" for Ford, or "J" for Jeep, etc.

In one embodiment, the vehicle identification system is comprised of the following elements. This list of possible constituent elements is intended to be exemplary only and it is not intended that this list be used to limit the system of the present application to just these elements. Persons having ordinary skill in the art relevant to the present disclosure may understand there to be equivalent elements that may be substituted within the present disclosure without changing the essential function or operation of the system.

1. NFC Tag with VIN stored thereon
2. NFC-enabled mobile computing device
3. Application database (mobile application) comprised of a software solution that includes a set of sub-components to execute read/write functions associated with system and perform analytics of data retrieved by way of the system, and which operates on the mobile computing device and communications with one or more remote servers by way of a wireless communications network.

The various elements of the system of the present invention as presented in this Specification may be related in the following exemplary fashion. The following examples is not intended to limit the scope or nature of the relationships between the various elements and the following examples are presented as illustrative examples only.

The main components of the system in some embodiments are related in ways such that the NFC tag has the VIN stored in it, and the NFC tag is placed at a convenient position of the vehicle such that the mobile computing device is able to make contact with it. The application database/software solution and any of its sub-components and modules operate on the mobile computing device to perform at least the following two operations with respect to the NFC tag and the associated VIN. Specifically, at least one of the sub-components operates in a manner that writes the VIN to the NFC tag when the mobile computing device makes contact with the NFC tag (e.g., by bumping, touching, or placing the NFC-enabled and/or embedded mobile device over the NFC tag). Another sub-component retrieves the VIN from an NFC tag by some form of contact (i.e., bumping, touching, placing, etc.) between the NFC enabled/embedded mobile device and the NFC tag.

In some embodiments, another sub-component may pass the VIN as an input parameter along with other variables to a mobile app or browser of the mobile computing device which will decode the VIN and provide the vehicle details along with other analytic solutions. For instance, a vehicle report of a particular vehicle may be generated after obtaining the vehicle history and information through identification of the VIN that a mobile device retrieves from an NFC tag placed on a bumper of the vehicle or at another convenient location along the exterior of the vehicle. As used herein vehicle report can mean one or more of the following: an appraisal value of a vehicle; a trade-in value of a vehicle; a purchase order of a vehicle; a dealer sales report; a dealer inventory report; dealership financial forecasting.

The system and method of the present invention generally works by near field communication (NFC) technology and one or more applications that use the NFC technology to perform one or more steps of the process. For instance, the applications may include the software solutions to use NFC tags in the automotive industry.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The innovation in this solution is the process in which an NFC-enabled mobile computing device makes contact with (i.e., by bumping, touching, or placing the mobile device) an NFC tag to launch a mobile app or web browser to show the vehicle details by decoding the VIN that is stored on the NFC tag. This innovation also includes the process and software of storing the VIN in an NFC tag which will be placed on a vehicle for data retrieval using any NFC-enabled mobile device.

In one exemplary embodiment, the vehicle identification system comprises: an NFC Tag with VIN stored in it; an NFC-enabled mobile device configured with an NFC receiver/transmitter which can read from and write to NFC tags; an application (software) database configured with a set of sub components, the database comprising
(i) a first sub-component to write (writer software application) a VIN to an NFC tag by bumping, touching, placing, or otherwise contacting the NFC Enabled/Embedded Mobile Device over the NFC tag;
(ii) a second sub-component to retrieve (reader software application) the VIN from the NFC tag by bumping or touching or placing the NFC enabled/embedded mobile device over the NFC tag. In some embodiments;
(iii) a third sub-component to pass the VIN as an input parameter along with other variables to a mobile app or web browser which will decode the VIN and provide the vehicle details along with other analytic solutions, such as vehicle information, vehicle values, and/or vehicle data.

In one embodiment, the first sub-component may be implemented as a mobile app which may display visual elements on a display screen of the mobile device in which the user can either manually enter the VIN or scan a VIN and in which the app may prompt the user to make contact with the NFC tag (i.e., by bumping, touching, or placing the NFC-enabled device near the NFC tag). The mobile app discovers the NFC tag via NFC technology and is configured to perform a write operation to store the VIN on the NFC Tag.

In one embodiment, the NFC tag with the VIN embedded in the tag is placed on an automotive vehicle. For instance, the NFC tag may be placed on a top corner of the windshield. In some embodiments, multiple NFC tags, which are programmed with and store the same VIN, may be placed at different locations on the vehicle. For example, a set of four NFC tags which store the same VIN may be placed on each corner of the vehicle.

In another embodiment, the second sub-component may include technology in permitting an NFC enabled/embedded mobile device to bump or touch or place the mobile device on this NFC tag, which will trigger the retrieve of the VIN stored in the NFC tag. In yet another embodiment, retrieval of the VIN from the NFC tag by the NFC enabled device initiates a mobile app or web browser to bring up a software solution that will take the VIN and other necessary parameters to decode the VIN and show the vehicle details along with all other analytics needed for the vehicle.

In another embodiment, a mobile application comprises method for enabling a mobile device having near-field communication capabilities to be used to retrieve a vehicle identification number from an NFC tag associated with a vehicle and to generate a vehicle report based on the retrieved VIN, the method comprising: receiving a request to transmit VIN information to the mobile device, the mobile device having an executable program wherein: in response to receiving the VIN information, the executable program is configured to enable the mobile device to transmit the VIN number received from the NFC tag to an application database wherein vehicle-related information is stored, and retrieve vehicle-related information by performing the steps of determining whether a vehicle value associated with the vehicle identified by the VIN is stored in a database; retrieving vehicle data from a third party source if the value is not found in the database; based on the vehicle data retrieved, calculating a vehicle value based on vehicle data obtained; storing the calculated value for remote retrieval from the database by a user; and transmitting the calculated value for display on a display screen of the mobile device.

In one embodiment, a non-transitory computer readable medium having recorded thereon a program that causes a portable device to execute a method for generating an electronic purchase order form for a vehicle associated with a vehicle identification number (VIN) stored on a near field communication tag, comprises: retrieving a VIN and VIN-associated data from a vehicle equipped with an NFC tag whereon VIN and VIN-associated data is written by an NFC-enabled portable device configured to read the NFC tag; entering a driver's license number or other driver identification information via an input on the NFC-enabled portable device; transferring one or both of the driver's license number or other driver identification information and the VIN and VIN-associated data via a wireless communications network from the NFC-enabled device to a database;

combining the one or both of the driver's license number or other driver identification information and the VIN and VIN-associated data and forming a purchase order record for the vehicle associated with the VIN; storing the purchase order record containing the driver identification information and vehicle information in the database for later retrieval; inputting the information associated with the purchase order record into one or more fields of a purchase order form stored in the database; and storing the populated purchase order form in the database for electronic delivery to a buyer or seller, thereby creating an electronic purchase order form for a particular vehicle of interest to the buyer or seller.

This process of using the NFC-enabled mobile computing device in relation to the NFC tags to retrieve and display vehicle information and other details has not, to date, existed and has not been implemented. This process and the software to program the NFC tag with a VIN and to pull up the vehicle details on a mobile computing or communication device is how an automotive near filed communication application may be implemented.

Turning now to the figures, the following Use Cases of the system shown in FIG. 1 describe how some embodiments of the invention are used with a mobile computing device which has software for the process.

FIG. 1 shows an exemplary vehicle information system for storage and retrieval of a VIN number of a vehicle, according to one embodiment of the present invention. In one general aspect, system 100 comprises an NFC tag 102, an NRC enabled device 104, and an application database 106, the application database comprising a read module 108, a write module 110, an analytics module 112, an application module. Application database 106 and sub-systems and modules associated therewith may be arranged in various configurations, such as on a server, or wherein various sub-systems and modules reside locally on the NFC enabled device, whereas modules such as the analytics module may reside on a server separate from the device, including a cloud server.

EXAMPLE OF USES

FIG. 1 shows the following examples of uses, designed Use Cases 1-6:
Use Case 1
1. The system is configured such that a User selects an NFC tag;
2. The system is configured such that User applies the NFC tag to a selected vehicle.
Use Case 2
1. The system is configured such that User enters a VIN of a selected vehicle manually;
2. The system is configured such that User scans the VIN of a selected vehicle using an NFC-enabled mobile device.
Use Case 3
1. The system is configured such that User uses a software mobile app operating on an NFC-enable mobile computing device to write to the NFC tag
Use Case 4
1. The system is configured such that User bumps/touches the NFC tag using the NFC-enabled device;
2. The system is configured such that the NFC tag activates and detects the device.
Use Case 5
1. The system is configured such that a VIN of the vehicle is retrieved by the software mobile app.

Use Case 6
1. The system is configured such that an automotive NFC App decodes the vehicle info;
2. The system is configured such that data associated with a specific vehicle is retrieved from the VIN and passed as a parameter to a mobile app or browser, and wherein analytic operations are performed to generate one or both of a vehicle value or vehicle report.

Figure 2:
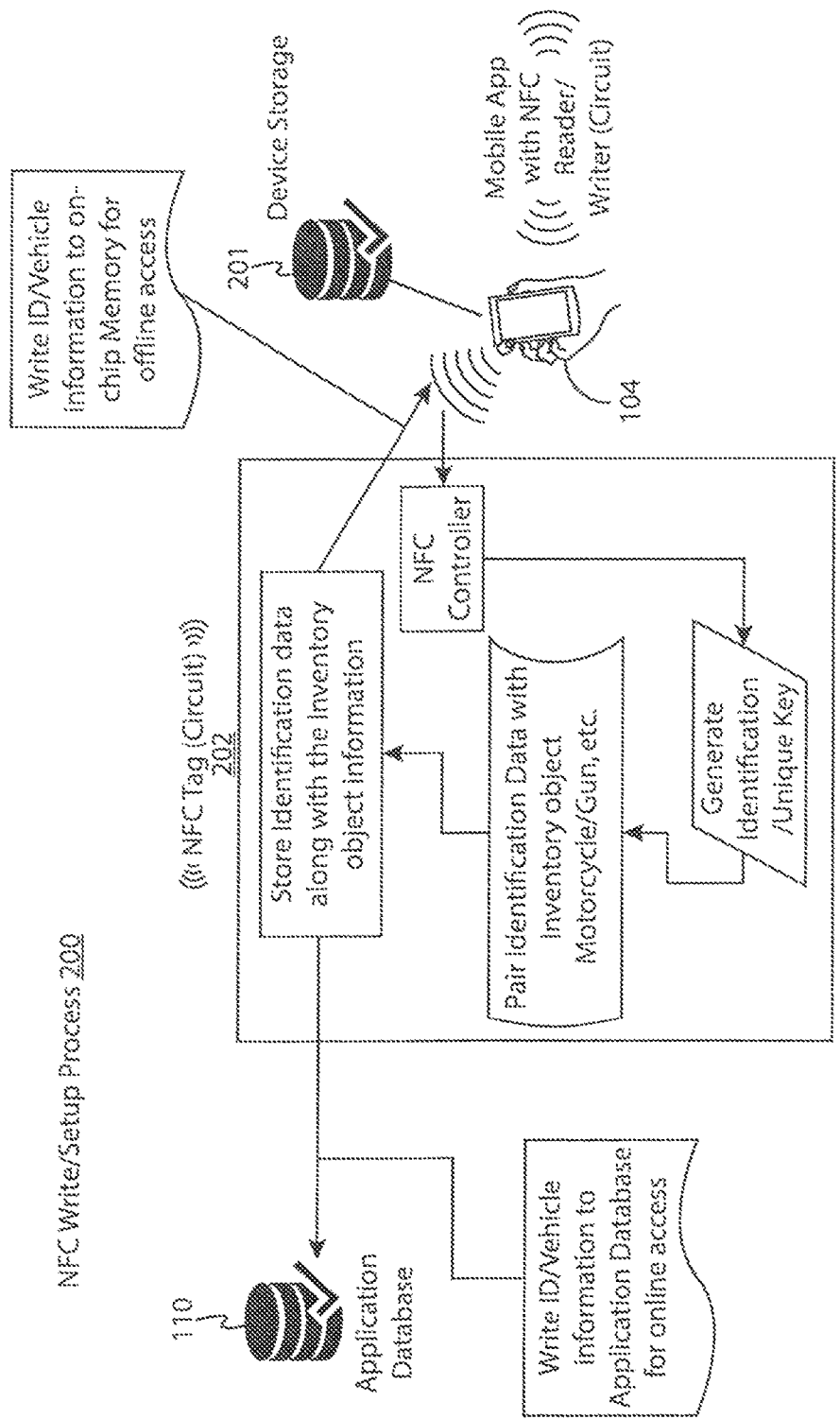
FIG. 2 shows an overview of an exemplary process for storing vehicle identification data and writing an NFC tag of the vehicle information system.

In one embodiment of the invention, the system is configured with an NFC-write process 200 to store vehicle data in an inventory database for later retrieval, according to one embodiment of the present invention is shown in FIG. 2. When the NFC tag is in communication with the NFC-enabled mobile device, and if the tag has not been previously populated with vehicle identifying information, the tag is void of data. The following steps occur in order to input ("write") vehicle data to the NFC tag (shown in FIG. 2), as indicated by NFC circuit 202. To begin the process of writing an NFC tag with data comprised of vehicle information, system—via the application database 112—sends a prompt to a user asking to confirm that a tag will be written, by displaying a prompt on the display of an NFC enabled device 104. Upon confirmation to write the tag, a unique identification number or other unique ID is generated by the system for the NFC tag. A request is sent for the user to input details about a vehicle/inventory object (details can include make, model, year of vehicle, or other information unique to the vehicle) and data is entered into the device by way of input means on the device. An entry id is established for the corresponding vehicle data, and is paired up with the unique identifier for the NFC tag 102 in order to create a vehicle record for the vehicle, and the vehicle record is stored in a database, wherein the database is stored on a server and in communication with the NFC enabled device 104 over a wireless communications network. Data, such as VIN, vehicle value and or vehicle report data may also reside locally on the NFC enabled device 104 by way of storage in local memory 201. Details regarding the vehicle and the vehicle record are written on the on-chip memory of the NFC tag 102.

Upon the completion of the above steps, the details about the inventory object are written to the NFC tag. The tag can then communicate with an NFC enabled device. In another embodiment, when the device is in direct communication with the NFC tag, details about the vehicle inventory object are retrieved from the database and sent from the database to the device.

Figure 3:
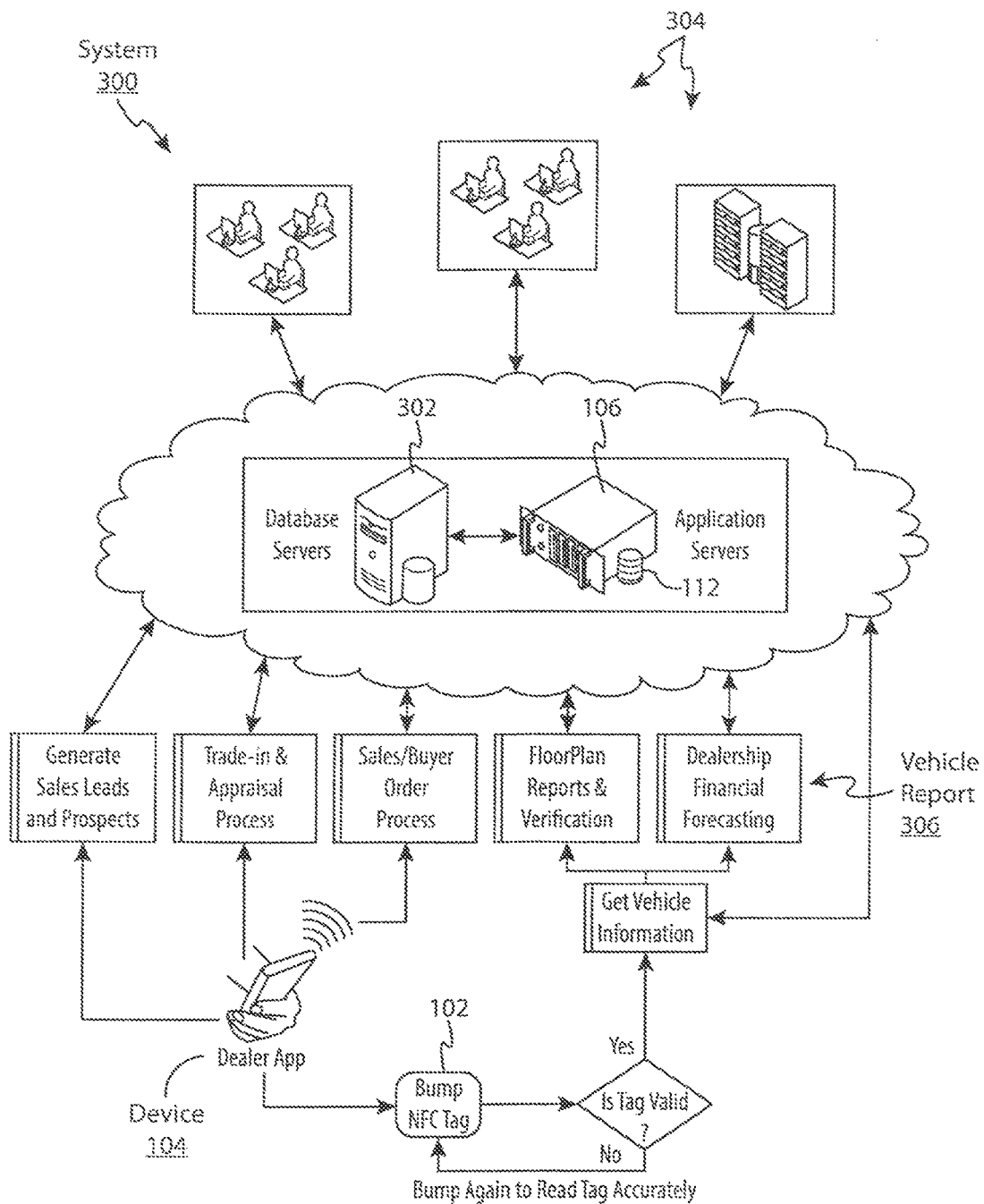
FIG. 3 shows an overview of an exemplary vehicle identification system, comprising a mobile application for processing vehicle information and wherein the application is configured for generating one of a vehicle value or vehicle report.

FIG. 3 shows an overview of an exemplary vehicle identification system 300 configured for generating a vehicle report based on VIN information retrieved from an NFC tag. In one embodiment, the system comprises a central database 302 linked or otherwise connected to other third-party databases, including but not limited to: third parties comprised of financial institutions, OEMs, manufacturers, insurance companies, and automobile dealerships, and wherein vehicle information, financing information and/or dealership information is stored for later retrieval.

In one embodiment, an NFC-enabled device 104 comes into contact with an NFC tag comprised of vehicle data and/or a link to vehicle data stored in a database, wherein the database may reside locally on the device, and/or remotely on a server. The system confirms that the tag is valid, upon which a request is sent to central database 302 to retrieve information associated with the vehicle record of the NFC tag. Vehicle information of the vehicle record is sent from database 302 to the NFC enabled device 104 and can be displayed on the device. The system is configured to facilitate the processing of one or more requests regarding a vehicle record, thereby generating a vehicle report 306. In one embodiment, the vehicle record includes data related to VIN, year, make, model, body style, trim, mileage, or other vehicle identifying information. In another embodiment, the vehicle report includes a vehicle condition report, an appraisal report, a buyer report, a purchase order, a dealer report, &/or a financial forecast report.

Figure 4:
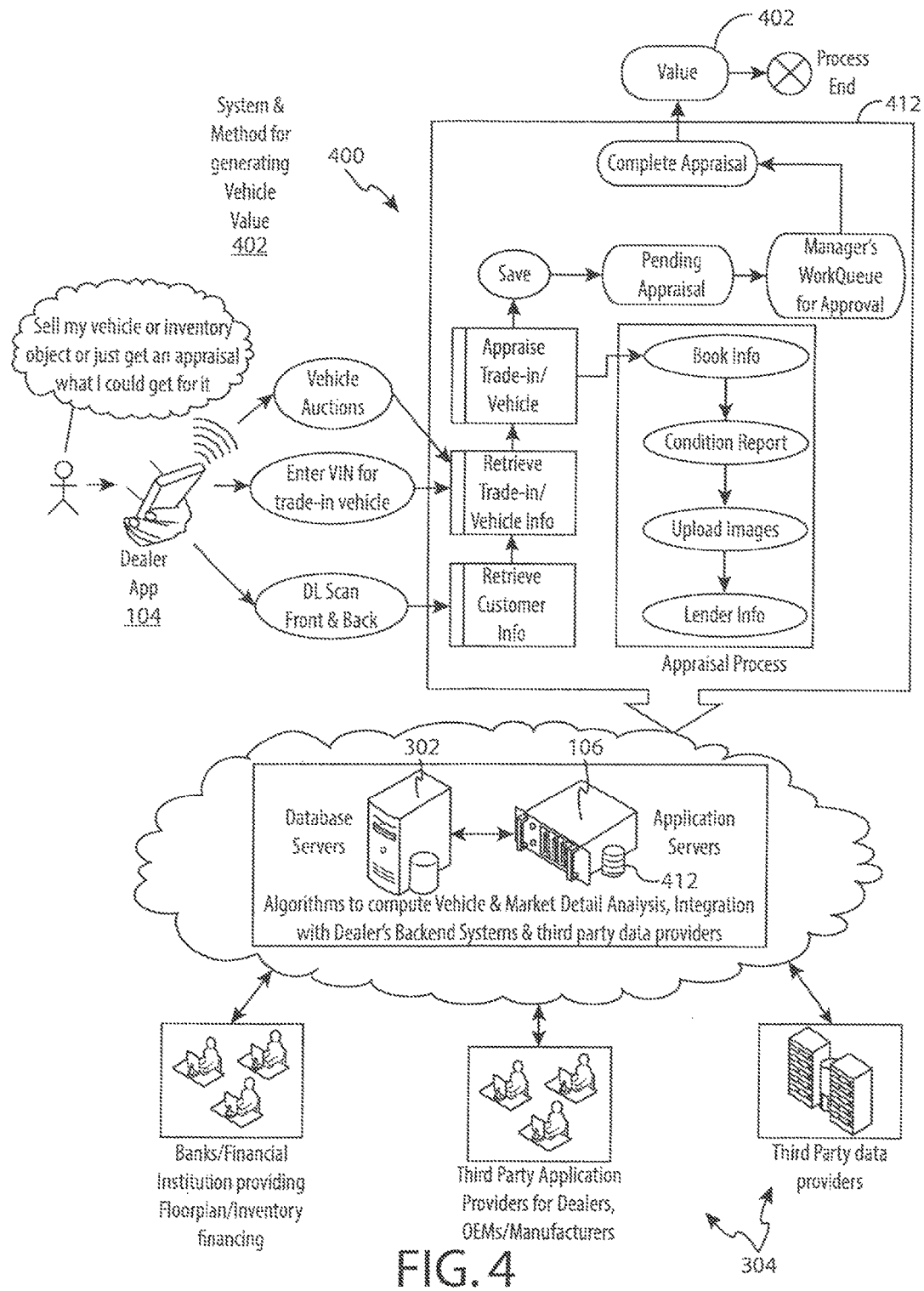
FIG. 4 shows an overview of an exemplary vehicle identification system, wherein the system is configured for generating a vehicle value based on a VIN retrieved from an NFC tag by an NFC enabled mobile device.

FIG. 4 shows a system 400 and method for generating a vehicle value according to one embodiment of the present invention. The system is configured to retrieve a VIN from an NFC tag and utilizing an analytics mode 412 of the application database, compare vehicle data to market data obtained from third party sources 304 in order to calculate a vehicle value 402, such as in the form of a value report or appraisal report. The vehicle value 402 is stored in database 302 for later retrieval and sent to NFC enabled device for display.

Figure 5:
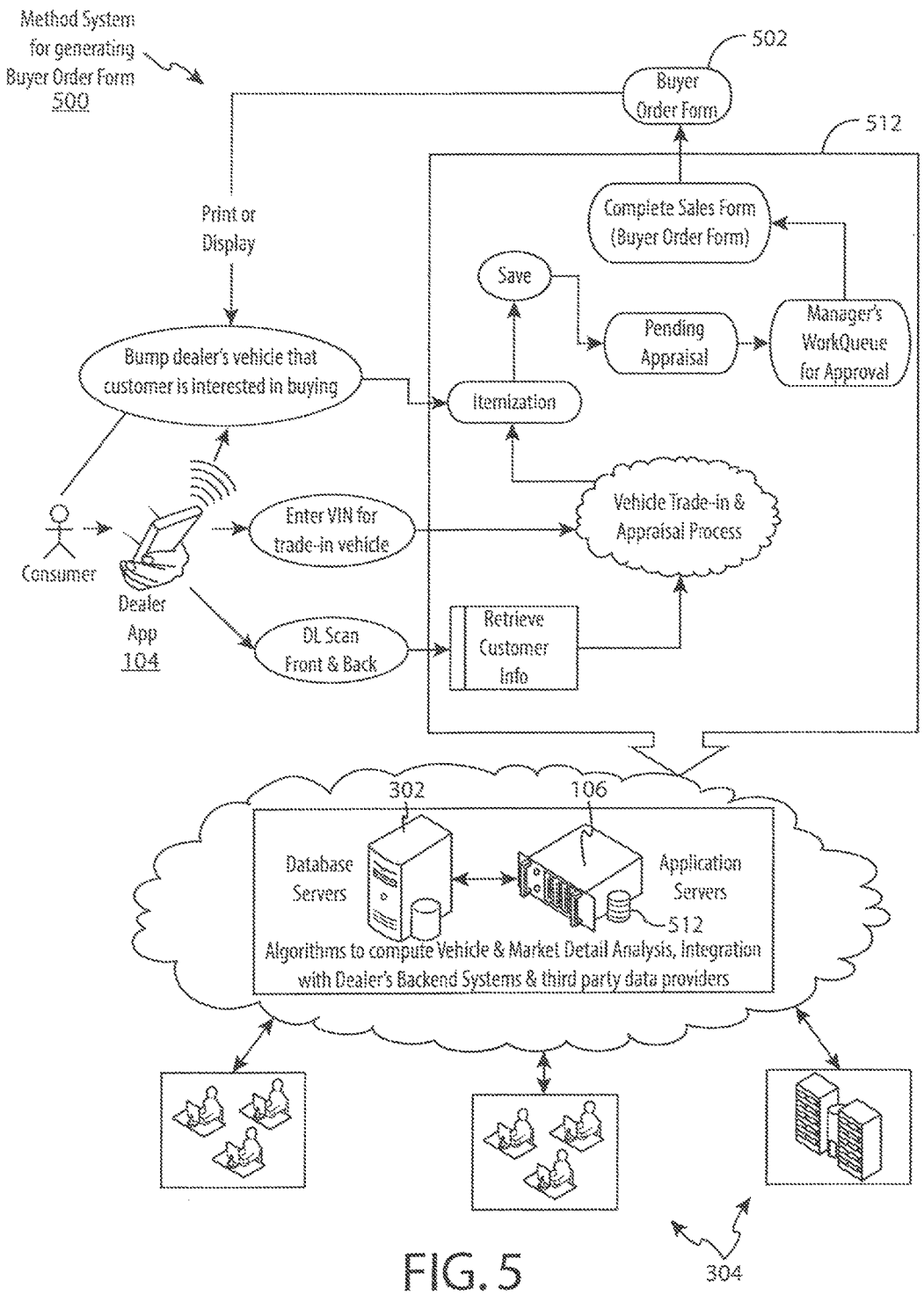
FIG. 5 shows an overview of an exemplary vehicle identification system, wherein the system is configured for generating an electronic order form/purchase order, based on a VIN retrieved from an NFC tag by an NFC enabled mobile device.

FIG. 5 shows a system 500 and method for generating a buyer order form 502. In addition to VIN information retrieved from the NFC tag, driver's license information of a potential purchaser is entered into the NFC enabled device 104, either by a scan of the driver's license or by manual entry of the driver's license information. The system is configured in this instance such that the analytics module 512 gathers relevant information regarding the purchaser, the vehicle of interest, and—optionally—trade-in vehicle information. The analytics module 512 generates buyer order form 502 that is then stored in database server 302 for later retrieval, and/or transmitted to the NFC enabled device 104, where it can be viewed on the device and/or downloaded for printing.

Figure 6:
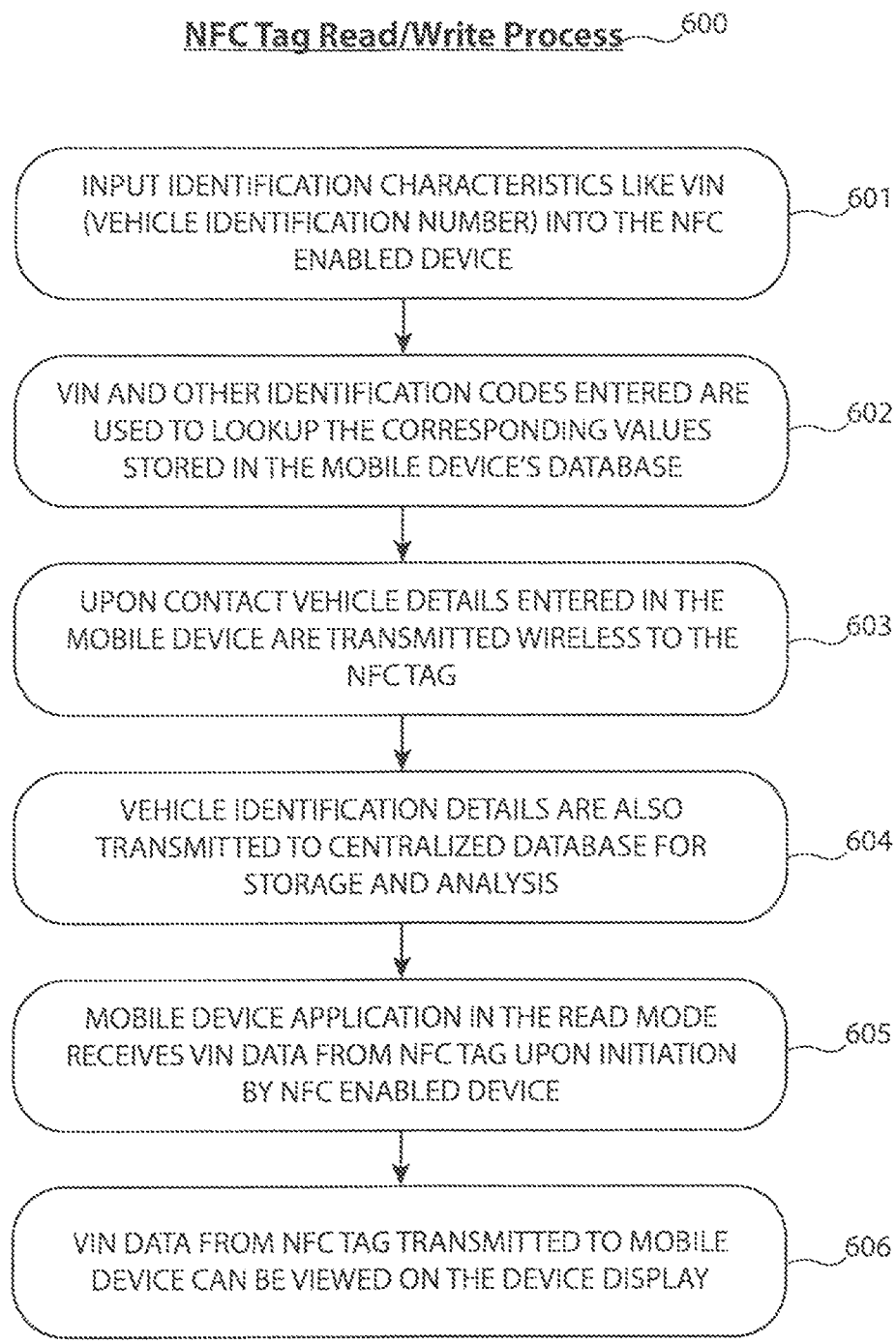
FIG. 6 is a flowchart showing the steps according to one embodiment of the invention in which a VIN or other vehicle data are stored to an NFC tag.

FIG. 6 shows an overview of the steps in an NFC tag read/write process 600 according to one embodiment of the invention, including inputting identifications characteristics into an NFC enabled device, for example input of VIN information by entering information directly into an NFC enabled device, such as a smartphone or portable tablet, at step 601. At step 602, VIN and/or other identifying codes entered are then used to look up the corresponding value stored in a database configured for connection with the device. At step 603, vehicle details entered into the NFC-enabled device are then transmitted and sent to the NFC tag by way of "bumping" the device to the tag, resulting the information being transmitted to the tag. At step 604, as vehicle details are transmitted to the NFC tag, details are also sent to one or more of a centralized database. At step 605, an NFC enabled device in the "read mode" receives vehicle information from the NFC tag upon initiation by the NFC enabled device. At step 606, vehicle data is transmitted from NFC tag to the NFC enabled portable device, and displayed on the display screen of the NFC enabled device.

Figure 7:
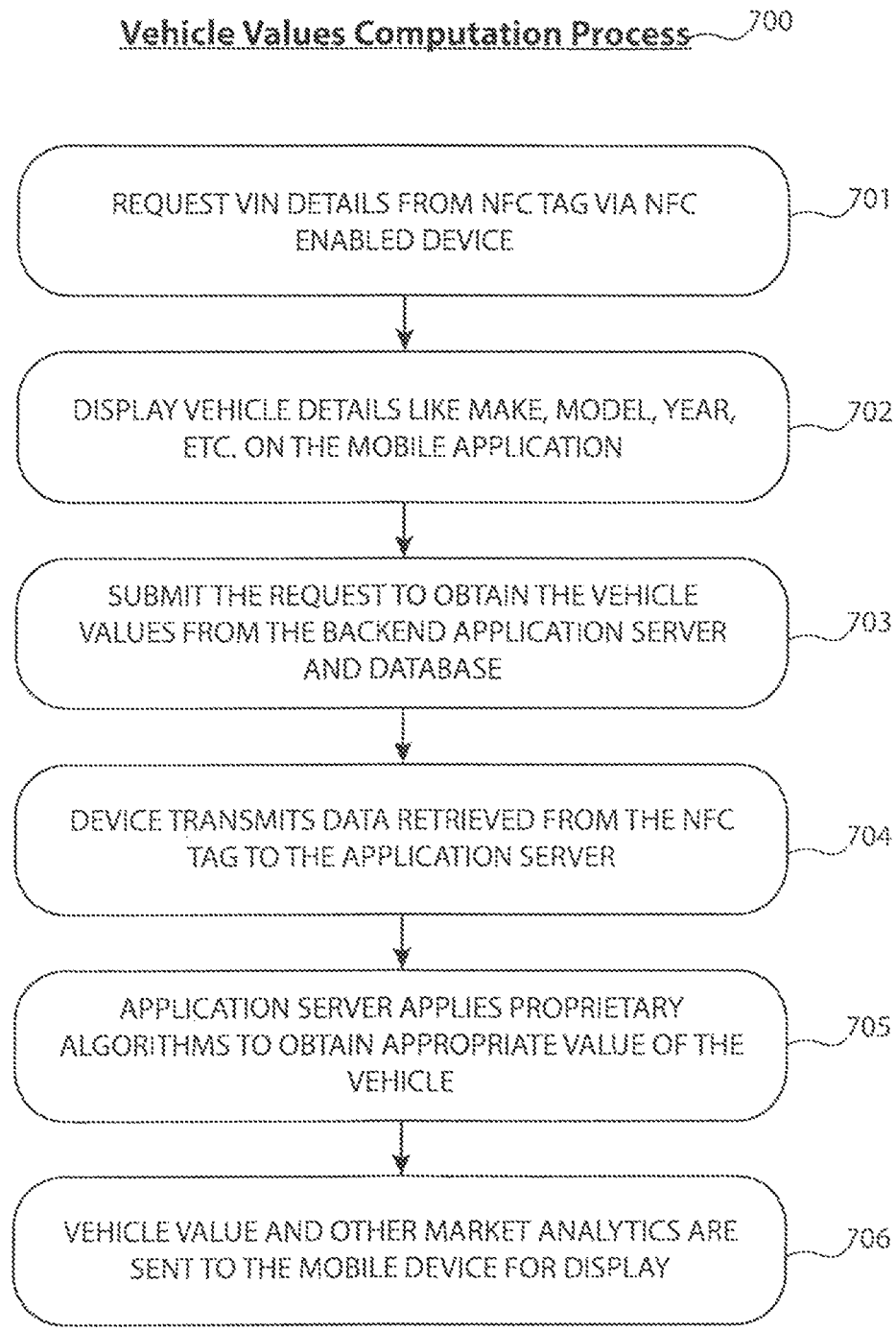
FIG. 7 is a flowchart showing the steps according to one embodiment of the invention in which a vehicle value is calculated based in part on vehicle information stored on and retrieved from an NFC tag of a vehicle identification system.

FIG. 7 shows an overview of a process for calculating vehicle values 700 according to one embodiment of the invention. An NFC enabled device sends a request to retrieve information stored on an NFC tag at step 701. Vehicle information may then be displayed on the NFC enabled device at step 702. A request is then sent to one or more databases to retrieve values related to the particular vehicle identified by the NFC tag at steps 703 and 704. At step 705, an application database comprised of one or more analytics modules calculates a vehicle value of the vehicle identified by the NFC tag. The calculated value is then sent to the NFC enabled device for display at step 706.

Figure 8:
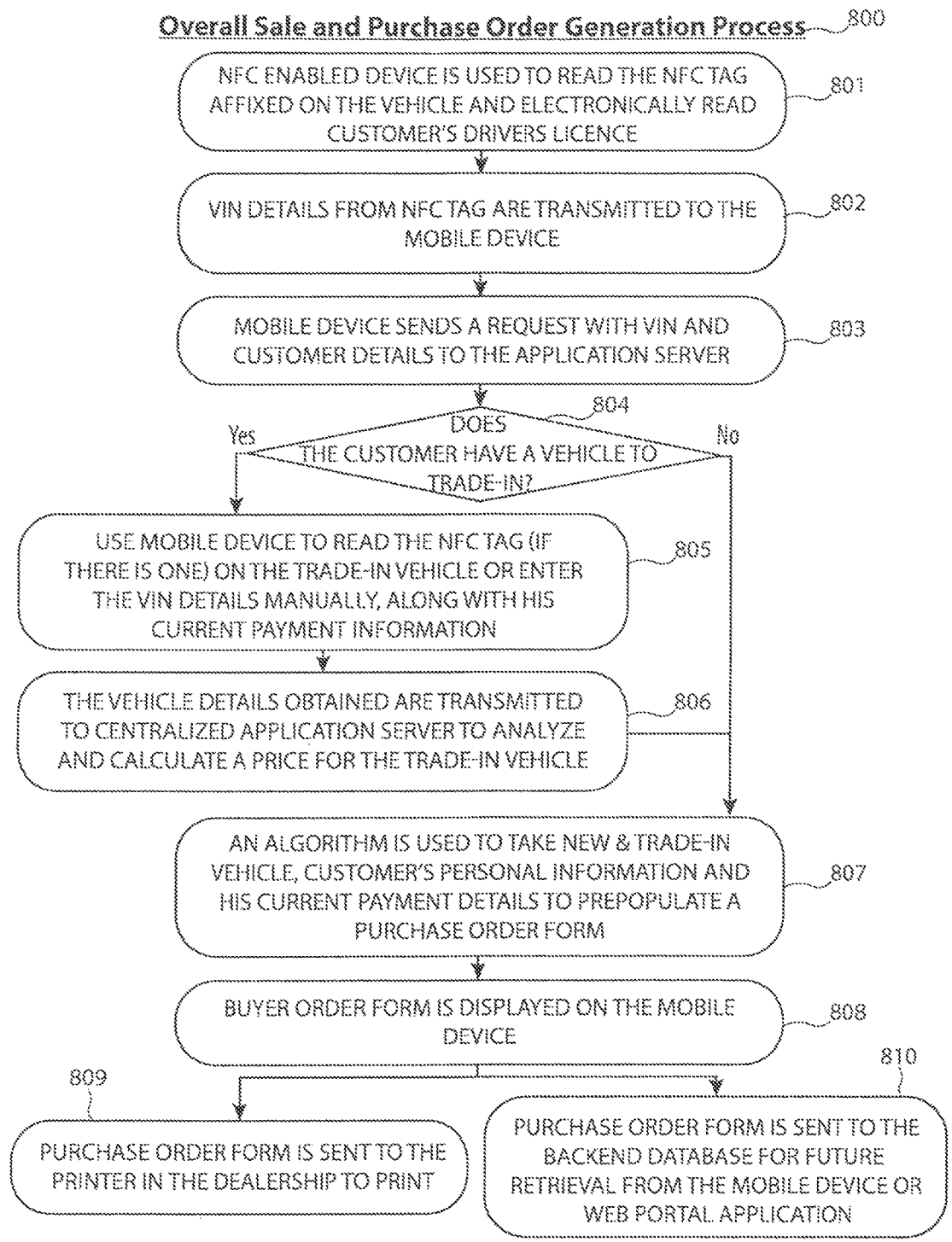
FIG. 8 is a flowchart showing the steps according to one embodiment of the invention in which an electronic purchase order is generated based in part on vehicle information stored on and retrieved from an NFC tag of a vehicle identification system.

FIG. 8 shows an overview of a process for generating a purchase order form for a vehicle based on vehicle information stored on an NFC tag and retrieved by an NFC enabled device, wherein the device is configured for wireless communication with an application database comprised of one or more of an analytics module for comparing vehicle information retrieved from the NFC tag with vehicle information stored on a database, wherein the database contains vehicle information retrieved from third parties, including but not limited to financial institutions, dealerships, manufacturers. In one embodiment, an NFC enabled device is used to read vehicle information stored on an NFC tag and to electronically retrieve information related to a driver's license. Information retrieved from the NFC tag and driver's license information is sent from the NFC enabled device to an application database. A query is then sent to the request input regarding a trade-in. If the customer has a trade-in vehicle, information related to the vehicle for trade in is collected from the user. The information may be entered manually by the user, or read electronically by the NFC enabled device from a vehicle equipped with an NFC tag containing vehicle information. The analytics module collects information necessary to complete a purchase order form and causes the system to pre-populate a purchase order form, wherein the form contains information such as buyer information, vehicle information and value information based on trade-in. In one embodiment, the pre-populated purchase order form is stored on the system database for remote retrieval such as through a web portal or mobile application, or delivered to a recipient for downloading and or printing from a portable device, such as a laptop, computer, tablet or smartphone.

Figure 9:
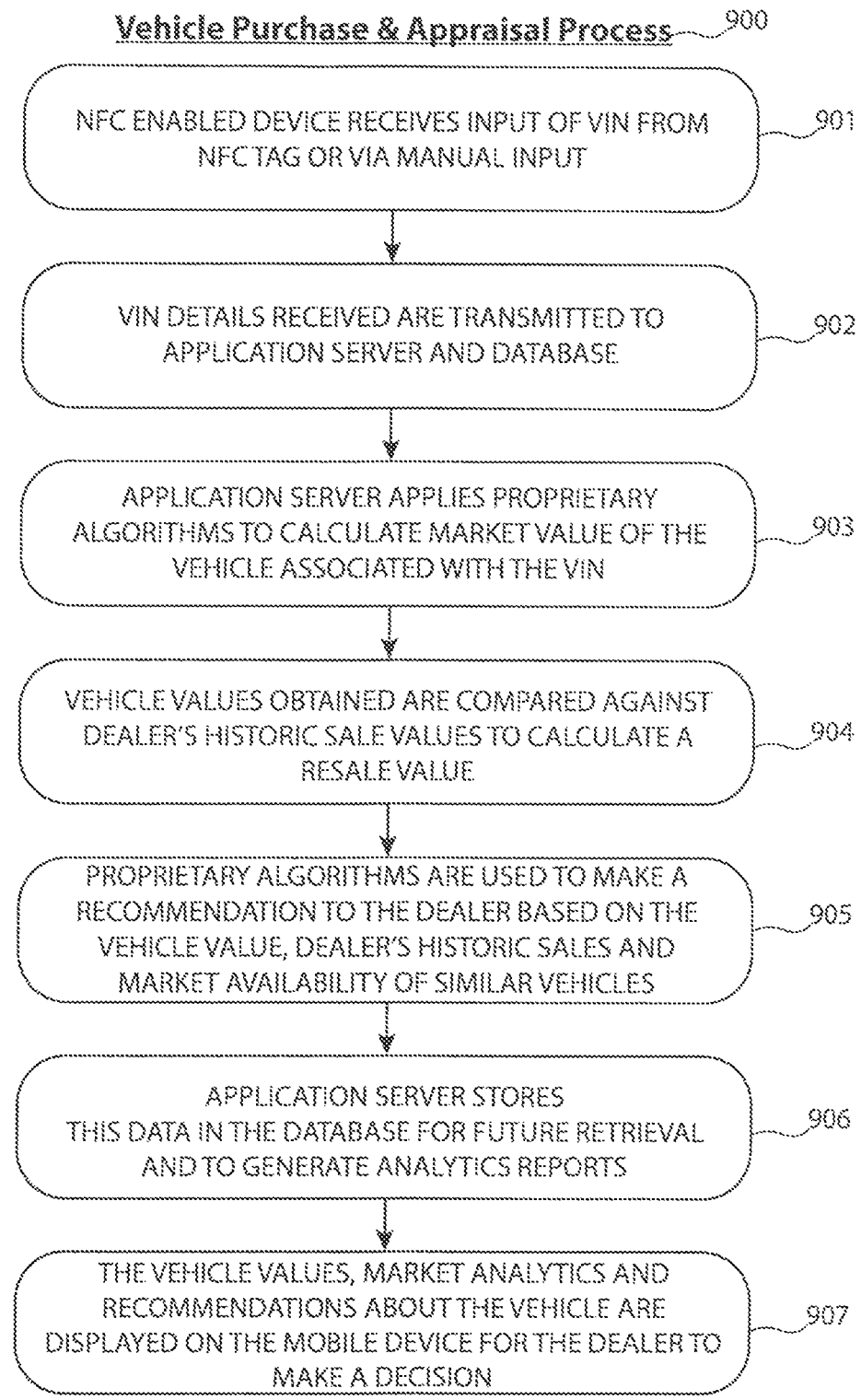
FIG. 9 is a flowchart showing the steps according to one embodiment of the invention in of an appraisal and purchase process based in part on vehicle information stored on and retrieved from an NFC tag of a vehicle identification system.

FIG. 9 show an overview of a vehicle appraisal process 900 according to one embodiment of the invention. An NFC enabled device receives a vehicle identification number, such as by manual entry from a user or by retrieving the information from an NFC tag at step 901. Vehicle information is transmitted from the device to an application database at step 902. An analytics module of the application database applies one or more algorithms in order to generate a vehicle value at step 903. The values obtained are then compared against dealership data in order to calculate a resale value of the vehicle associated with the VIN number at step 904. If a resale value is desired, the system is configured to generate a recommended value for resale at step 905. The application database stores vehicle information and resale value at step 906. The vehicle value and vehicle analytics are transmitted to the NFC enabled device for display on the device at step 907. Alternatively, the vehicle value and analytics are stored on the server for later retrieval, such as through a web portal or mobile application.

Figure 10:
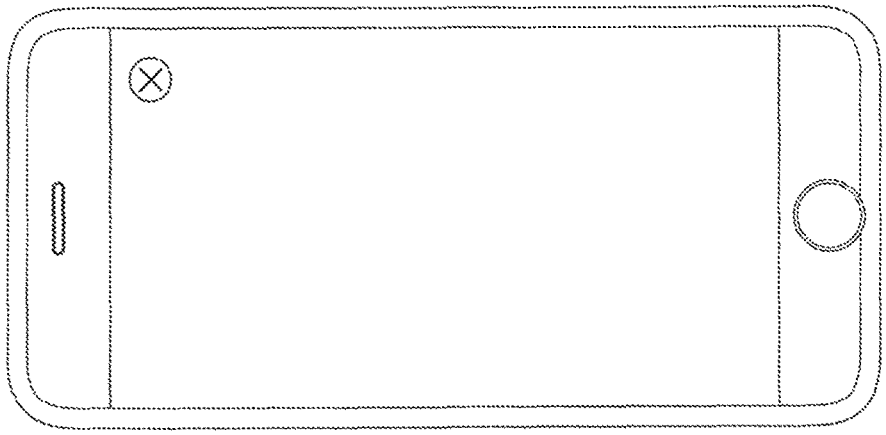
FIG. 10 shows a screen shot of an NFC enabled portable device configured with a mobile application for storage and retrieval of a VIN according to one embodiment of the present invention.
Figure 10:
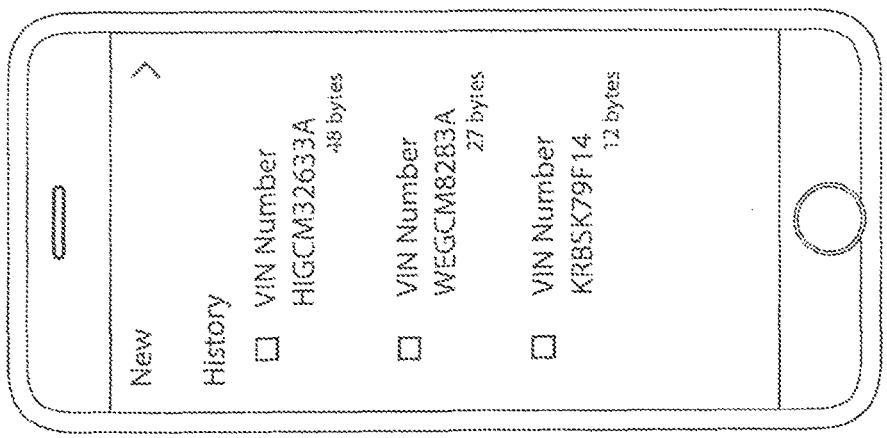
Figure 10:
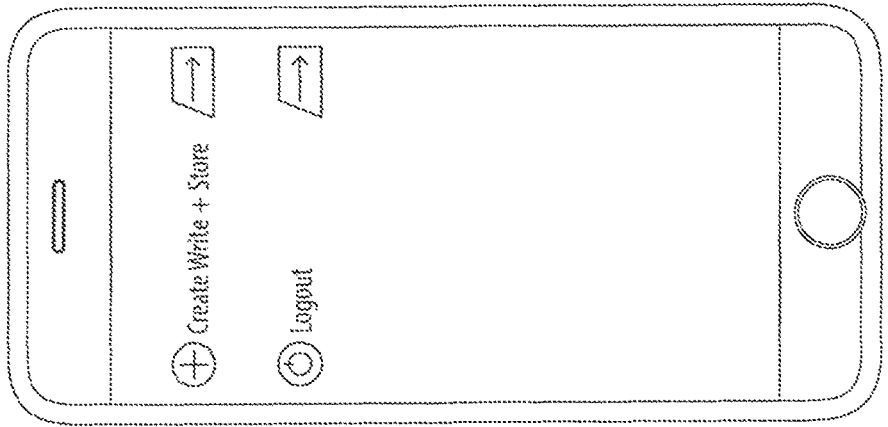
Figure 11:
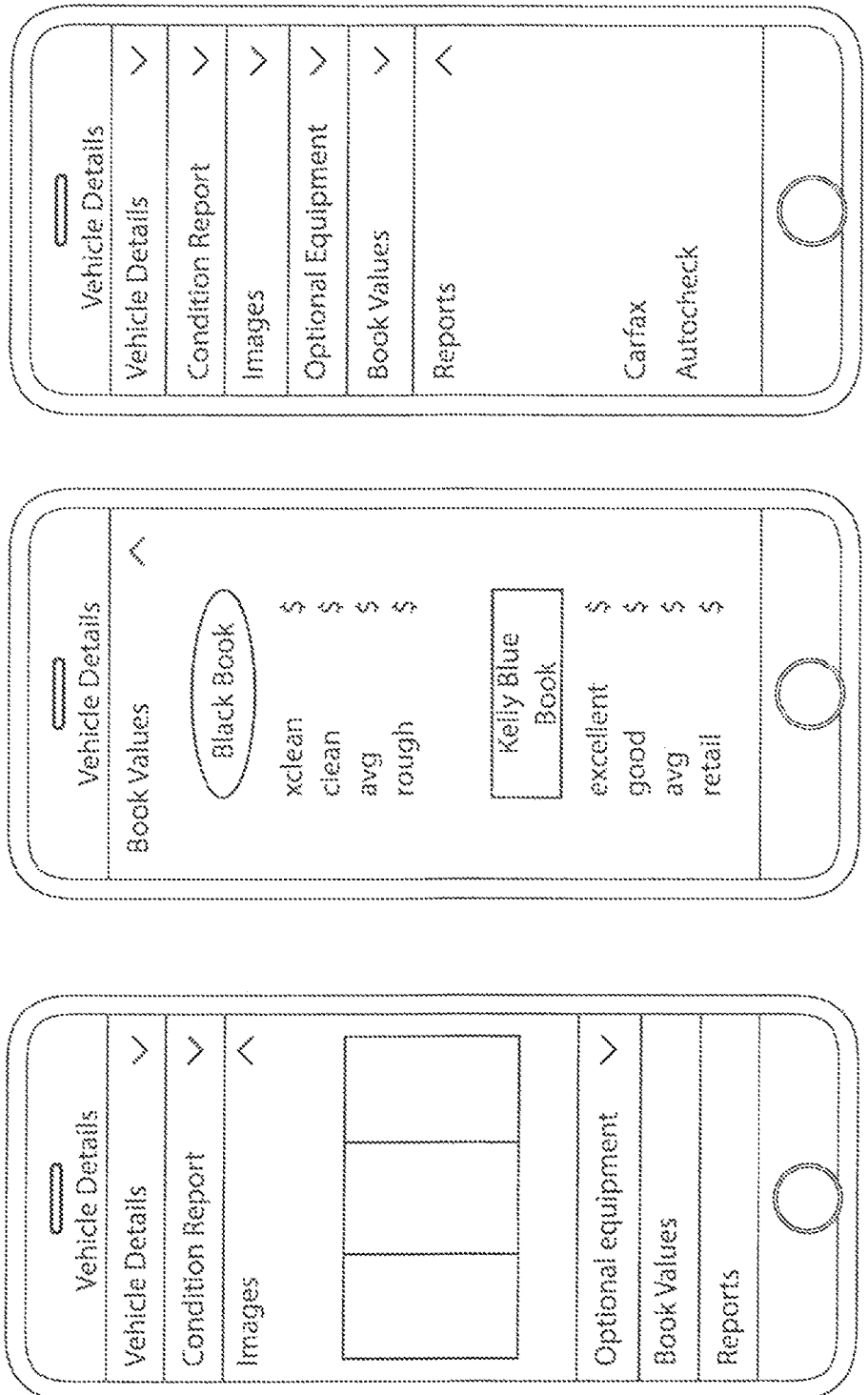
FIG. 11 shows a screen shot of an NFC enabled portable device configured with a mobile application for generating a vehicle value or vehicle report according to one embodiment of the present invention.

FIGS. 10 and 11 show screen shots of a mobile application running on an NFC enabled device, according to one exemplary embodiment of the invention. FIG. 10 shows—by way of exemplary screen shots—initiation of the write application mode, whether by manual entry on the device using the mobile device keyboard, or automatic scan of VIN and vehicle details to/from the NFC tag, by the user is displayed on the screen of the mobile device running the application. FIG. 11 shows—by way of exemplary screen shots—retrieval and display of vehicle details, including but not limited to vehicle report, vehicle photos, book values, vehicle reports, condition reports (interior/exterior/mechanical), are displayed to the user on the display screen of the mobile device running the application.

In additional embodiments, the system and application of the invention may be configured for the following: an on-line/off-line mode and web-based access of vehicle reports.

In one embodiment, the reader software application is configured to operate in an on-line mode and an off-line mode. To operate to the off-line mode, the system is configured so that if no connection is available—such as inability for the system to connect over a wireless communications network—the mobile device will store any data retrieved from the NFC tag in local memory on the device. The application is configured to detect the ability to connect over a wireless network, and push any data from local memory on the device to the server.

In another embodiment, the system is configured for remote storage of vehicle data and vehicle reports for remote retrieval and web-based access by a user. In yet another embodiment, remote access may be customized and password protected.

Additionally, in some embodiments this innovation can be adapted and extended to other motor vehicles, such as those motor vehicles ordinarily used in activities include power sports (e.g., motorcycling, snowmobiling, ATV riding, etc.) which include Vehicle Identification Number for motorcycles, snowmobiles, all-terrain vehicles (ATVs), chassis number, HIN (Hull identification Number) for boats, ID Numbers for personal watercraft and all uniquely identifiable numbers of any automotive vehicle. Also, it can create Identification Number Retrieval Products using NFC tags in different motor vehicles like Vehicle Identification Number retrieval Product for Motorcycles, Chassis Number retrieval product, HIN (Hull Identification Number) retrieval product for boats, ID numbers retrieval product for personal watercraft, snowmobiles, ATVs, etc.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A system that retrieves vehicle information by way of a vehicle identification number (VIN) stored on a near field communication (NFC) tag, the system comprising:
    an NFC-enabled mobile computing device comprising a storage device, a processor, and an NFC receiver/transmitter that can read from and write to an NFC tag;
    the NFC tag comprising an internally-stored VIN, the NFC tag placed at a position on the vehicle accessible by the NFC-enabled mobile computing device; and
    a mobile software application that is installed on the storage device of the NFC-enabled mobile computing device and executed by the processor,
        wherein the mobile software application is launched in response to the NFC-enabled mobile computing device physically contacting and activating the NFC tag,
        wherein the mobile software application retrieves the VIN from the NFC tag in response to the NFC-enabled mobile computing device physically contacting and activating the NFC tag,
        wherein the mobile software application decodes the VIN retrieved from the NFC tag to display vehicle details associated with the vehicle on the NFC-enabled mobile computing device, and
        wherein the mobile software application transfers the VIN and associated VIN-information to a database for storage and later retrieval
        collecting vehicle data from one or more of a third party database;
        analyzing vehicle data associated with the VIN and the vehicle data collected from the third party database; and
        calculating one of a vehicle value or vehicle report.

2. The system of claim 1, wherein the database resides on a server, including a cloud-based server.

3. The system of claim 1, wherein the NFC-enabled mobile computing device is configured for communication over a wireless network to one or more of a database residing on a server.

4. A method, the method comprising:
    launching, in response to an NFC-enabled portable device physically contacting and activating an NFC tag on a vehicle, a mobile software application executing on the NFC-enabled portable device, wherein the mobile software application is a launched by utilizing a storage device and a processor of the NFC-enabled portable device;
    retrieving, by utilizing the mobile software application of the NFC-enabled portable device and in response to the NFC-enabled portable device physically contacting and activating the NFC tag, a VIN and VIN-associated data from the vehicle equipped with the NFC tag whereon VIN and VIN-associated data is written by the NFC-enabled portable device;
    transferring, by utilizing the NFC-enabled portable device, the VIN and VIN-associated data via a wireless communications network from the NFC-enabled portable device to a database, wherein a collection of third-party vehicle information is stored;
    comparing the VIN and VIN-associated data retrieved from the vehicle equipped with the NFC tag to the database of third-party vehicle information in order to calculate a value for the vehicle associated with the VIN; and
    transmitting the calculated value for display on the NFC-enabled portable device.

5. The method of claim 4, wherein the value is one or more of an appraisal value, a trade-in value, or an auction value of a vehicle.

6. A method, the method comprising:
    launching, in response to an NFC-enabled portable device physically contacting and activating an NFC tag on a vehicle, a mobile software application executing on the NFC-enabled portable device, wherein the mobile software application is a launched by utilizing a storage device and a memory of the NFC-enabled portable device;
    retrieving, by utilizing the mobile software application of the NFC-enabled portable device and in response to the NFC-enabled portable device physically contacting and activating the NFC tag, a VIN and VIN-associated data from the vehicle equipped with the NFC tag whereon the VIN and VIN-associated data is written by the NFC-enabled portable device;
    receiving a driver's license number or other driver identification information via an input on the NFC-enabled portable device;
    transferring, by utilizing the NFC-enabled portable device, one or both of the driver's license number or other driver identification information and the VIN and VIN-associated data via a wireless communications network from the NFC-enabled portable device to a database;

combining the one or both of the driver's license number or other driver identification information and the VIN and VIN-associated data and forming an order record for the vehicle;

storing the order record in the database for later retrieval;

inputting the information associated with the order record into one or more fields of an electronic order form stored in the database, thereby generating a populated electronic order form; and storing the populated electronic order form in the database for electronic delivery to a recipient, wherein the populated electronic order form is populated with identifying information related to a driver associated with the driver's license number or other driver identification and the vehicle.

7. The method of claim 6, further comprising:

displaying the populated electronic order form on the NFC-enabled portable device.

8. A portable physical device comprising:

a display;

an NFC receiver/transmitter;

a hardware processor that performs operations, the operations comprising:

launching, by utilizing the NFC receiver/transmitter and in response to the portable physical device physically contacting and activating an NFC tag on a vehicle, a mobile software application executing on the portable physical device;

communicating with the NFC tag, wherein the NFC tag comprises an internally stored VIN and VIN-associated data, wherein NFC receiver/transmitter and the processor communicate with the NFC tag in response to the portable physical device physically contacting and activating the NFC tag;

obtaining the VIN and VIN-associated data by utilizing the NFC receiver/transmitter configured to read from and write to the NFC tag;

decoding, by utilizing the mobile software application, the VIN obtained from the NFC tag to display vehicle details associated with the vehicle on the portable physical device; and transmitting the VIN and VIN-associated data to a database for storage and later retrieval by the portable physical device.

9. A non-transitory computer readable medium having recorded thereon a program that causes a hardware processor of a portable physical device to perform operations comprising:

launching, in response to the portable physical device physically contacting and activating an NFC tag on a vehicle, a mobile software application executing on the portable physical device;

retrieving, by utilizing the mobile software application of the portable physical device and in response to the portable physical device physically contacting and activating the NFC tag, a VIN and VIN-associated data from the vehicle equipped with the NFC tag whereon VIN and VIN-associated data is written by the physical portable device;

transferring, by utilizing the portable physical device, the VIN and VIN-associated data via a wireless communications network from the portably physical device to a database, wherein a collection of third-party vehicle information is stored;

comparing the VIN retrieved from the vehicle equipped with the NFC tag to the collection of third-party vehicle information in order to calculate a value for the vehicle associated with the VIN.

10. The method of claim 9, further comprising:

transmitting the value calculated for the vehicle for display on the portable physical device.

11. The method of claim 9, further comprising:

storing the value calculated for the vehicle in a database for retrieval by a user.

* * * * *